US012696205B2

(12) United States Patent
Zisimopoulos et al.

(10) Patent No.: US 12,696,205 B2
(45) Date of Patent: Jul. 28, 2026

(54) DISCOVERY SIGNALS FOR MOBILE RELAYS

(71) Applicant: QUALCOMM Incorporated, San Diego, CA (US)

(72) Inventors: Haris Zisimopoulos, London (GB); Lenaig Genevieve Chaponniere, La Jolla, CA (US); Hong Cheng, Basking Ridge, NJ (US); Karl Georg Hampel, Hoboken, NJ (US); Sebastian Speicher, Wallisellen (CH); Alberto Rico Alvarino, San Diego, CA (US)

( * ) Notice: Subject to any disclaimer, the term of this patent is extended or adjusted under 35 U.S.C. 154(b) by 0 days.

(21) Appl. No.: 17/021,987

(22) Filed: Sep. 15, 2020

(65) Prior Publication Data

US 2021/0084603 A1     Mar. 18, 2021

(30) Foreign Application Priority Data

Sep. 16, 2019    (GR) ............................... 20190100400

(51) Int. Cl.
*H04W 56/00*         (2009.01)
*H04B 7/155*         (2006.01)
                    (Continued)
(52) U.S. Cl.
CPC .......... *H04W 56/001* (2013.01); *H04B 7/155* (2013.01); *H04L 5/0048* (2013.01);
                    (Continued)
(58) Field of Classification Search
CPC ......... H04W 56/001; H04W 36/00837; H04W 36/0058; H04W 24/10; H04W 36/04; H04W 72/005; H04B 7/155; H04L 5/0048
See application file for complete search history.

(56) References Cited

U.S. PATENT DOCUMENTS

2013/0016630 A1     1/2013  Bhushan
2014/0086138 A1     3/2014  Teyeb et al.
(Continued)

FOREIGN PATENT DOCUMENTS

CN     110149642 A     8/2019
EP     3749003 A1     12/2020
(Continued)

OTHER PUBLICATIONS

VIVO: "Remaining aspects on NR-PBCH", 3GPP Draft; RI-1801507 Remaining Aspects on NR-PBCH, 3rd Generation Partnership Project (3GPP), Mobile Competence Centre; 650, Route Des Lucioles ; F-06921 Sophia-Antipolis Cedex; France, vol. RAN WGI, No. Greece, Athens; Feb. 26, 2018-Mar. 2, 2018 Feb. 15, 2018 (Feb. 15, 2018), XP051396759, Retrieved from the Internet: URL:http://www. 3gpp.org/ftp/tsg%5Fran/WG1% 5FRL1/TSGR1%5F92/Docs/ [retrieved on Feb. 15, 2018] p. 1-p. 2.

(Continued)

*Primary Examiner* — Eric Myers

(57) ABSTRACT

A mobile relay generates a synchronization signal/physical broadcast channel block (SSB) for the mobile relay using at least one of a primary synchronization signal (PSS) for mobile relays that is different than a stationary base station PSS, a secondary synchronization signal (SSS) for mobile relays that is different than a stationary base station SSS, a physical broadcast channel (PBCH) that is different than a stationary base station PBCH, or a demodulation reference signal (DMRS) associated with the PBCH that is different than a stationary base station DMRS. After generating the SSB, the mobile relay broadcasts the SSB. A UE receiving the SSB determines that the SSB is from a mobile relay based, at least in part, on information comprised in the SSB.

16 Claims, 13 Drawing Sheets

400

– – – – PC5 link
———— Uu link

(51) Int. Cl.

| | |
|---|---|
| *H04L 5/00* | (2006.01) |
| *H04W 24/10* | (2009.01) |
| *H04W 36/00* | (2009.01) |
| *H04W 36/04* | (2009.01) |
| *H04W 36/36* | (2009.01) |
| *H04W 72/30* | (2023.01) |

(52) U.S. Cl.
CPC ....... *H04W 24/10* (2013.01); *H04W 36/0058* (2018.08); *H04W 36/04* (2013.01); *H04W 72/30* (2023.01); *H04W 36/00838* (2023.05); *H04W 36/362* (2023.05)

(56) References Cited

U.S. PATENT DOCUMENTS

| | | | |
|---|---|---|---|
| 2015/0215851 A1 | 7/2015 | Sivavakeesar | |
| 2017/0373812 A1 | 12/2017 | Berggren et al. | |
| 2018/0234931 A1 | 8/2018 | Ly et al. | |
| 2018/0287866 A1* | 10/2018 | Yoon ................... | H04B 17/318 |
| 2018/0294910 A1 | 10/2018 | Kim et al. | |

| | | | |
|---|---|---|---|
| 2019/0007925 A1* | 1/2019 | Frenger ................ | H04W 76/11 |
| 2019/0281587 A1 | 9/2019 | Zhang et al. | |
| 2021/0360558 A1* | 11/2021 | Zheng ................ | H04L 27/2662 |

FOREIGN PATENT DOCUMENTS

| | | |
|---|---|---|
| WO | 2018164544 A1 | 9/2018 |
| WO | 2019-154060 A1 | 8/2019 |

OTHER PUBLICATIONS

VIVO: Remaining aspects on NR-PBCH, 3GPP Draft; RI-1800173 Remaining Aspects on NR-PBCH, 3rd Generation Partnership Project (3GPP), Mobile Competence Centre; 650, Route Des Lucioles; F-06921 Sophia-Antipolis Cedex; France, vol. RAN WGI, No. Vancouver, Canada; Jan. 22, 2018-Jan. 26, 2018 Jan. 13, 2018 (Jan. 13, 2018), XP051384663, Retrieved from the Internet: URL:http://www.3gpp.org/ftp/tsg%5Fran/WG1%5FRL1/TSGR1%5FAH/NR%5FAH%5F1801/Docs/[retrieved on Jan. 13, 2018] p. 1-p. 2.

International Search Report and Written Opinion dated Nov. 25, 2020 from corresponding PCT Application No. PCT/US2020/051070.

\* cited by examiner

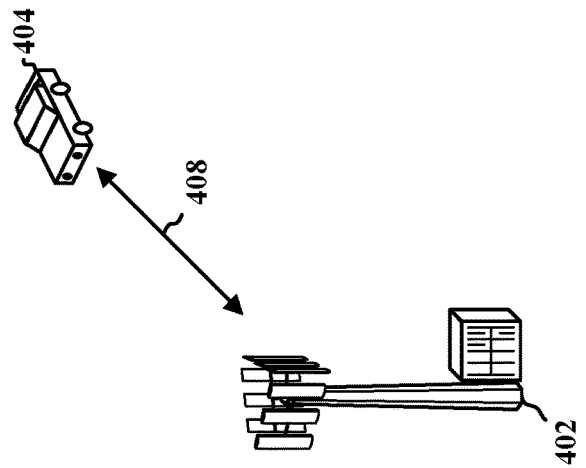
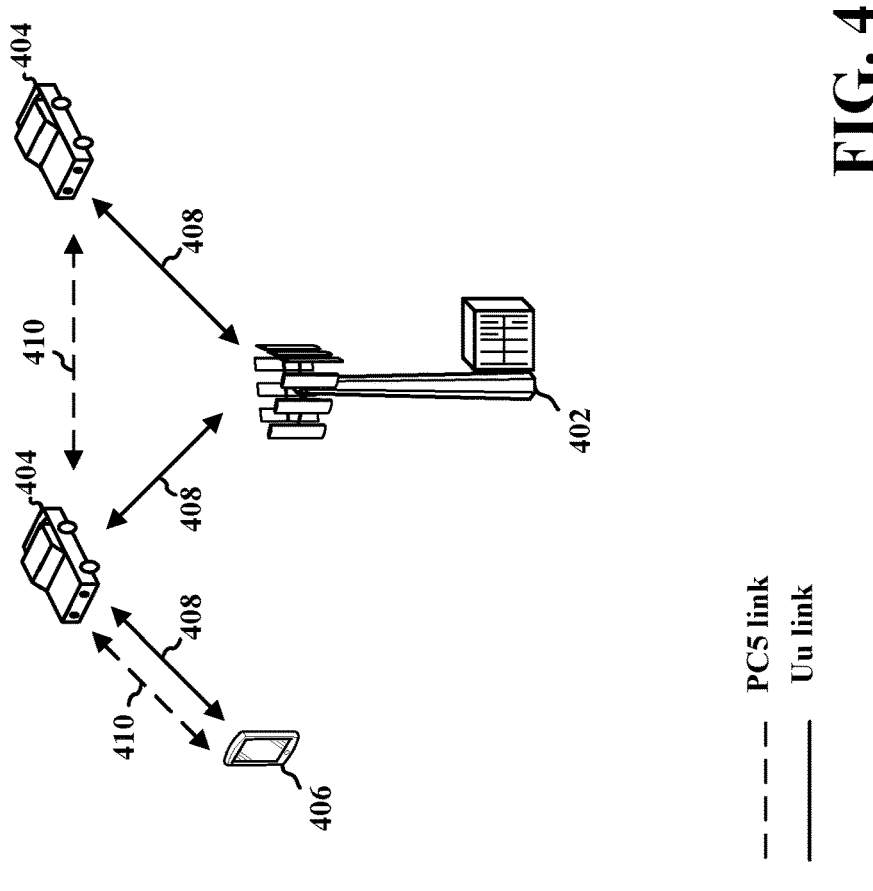
FIG. 4

602 Generate assistance information about wireless communication with relay nodes 604 Receive a report that the UE supports communication with mobile relays 606 Transmit the assistance information 608 Enable/disable camping on a mobile relay

600

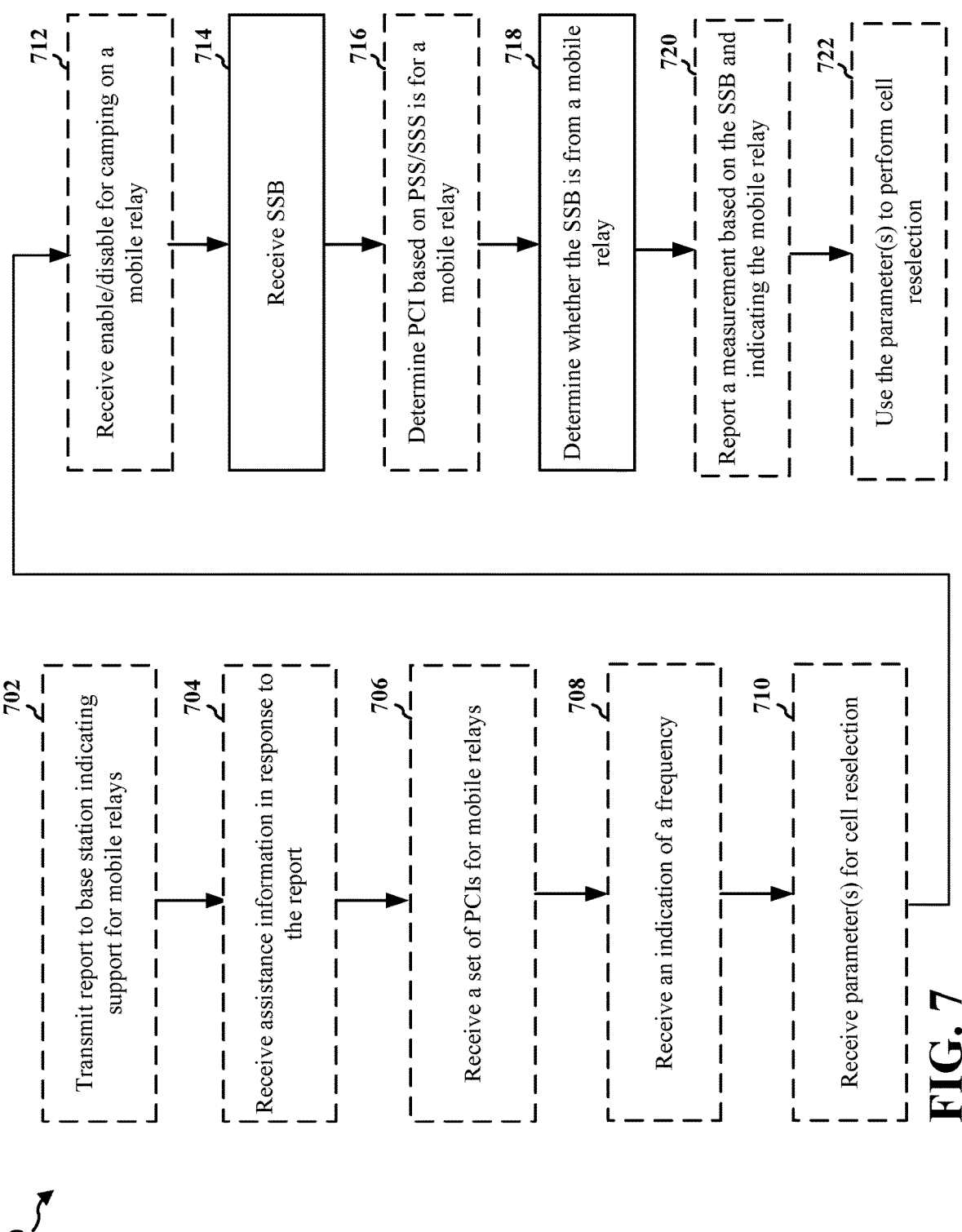

712 — Receive enable/disable for camping on a mobile relay

714 — Receive SSB

716 — Determine PCI based on PSS/SSS is for a mobile relay

718 — Determine whether the SSB is from a mobile relay

720 — Report a measurement based on the SSB and indicating the mobile relay

722 — Use the parameter(s) to perform cell reselection

702 — Transmit report to base station indicating support for mobile relays

704 — Receive assistance information in response to the report

706 — Receive a set of PCIs for mobile relays

708 — Receive an indication of a frequency

710 — Receive parameter(s) for cell reselection

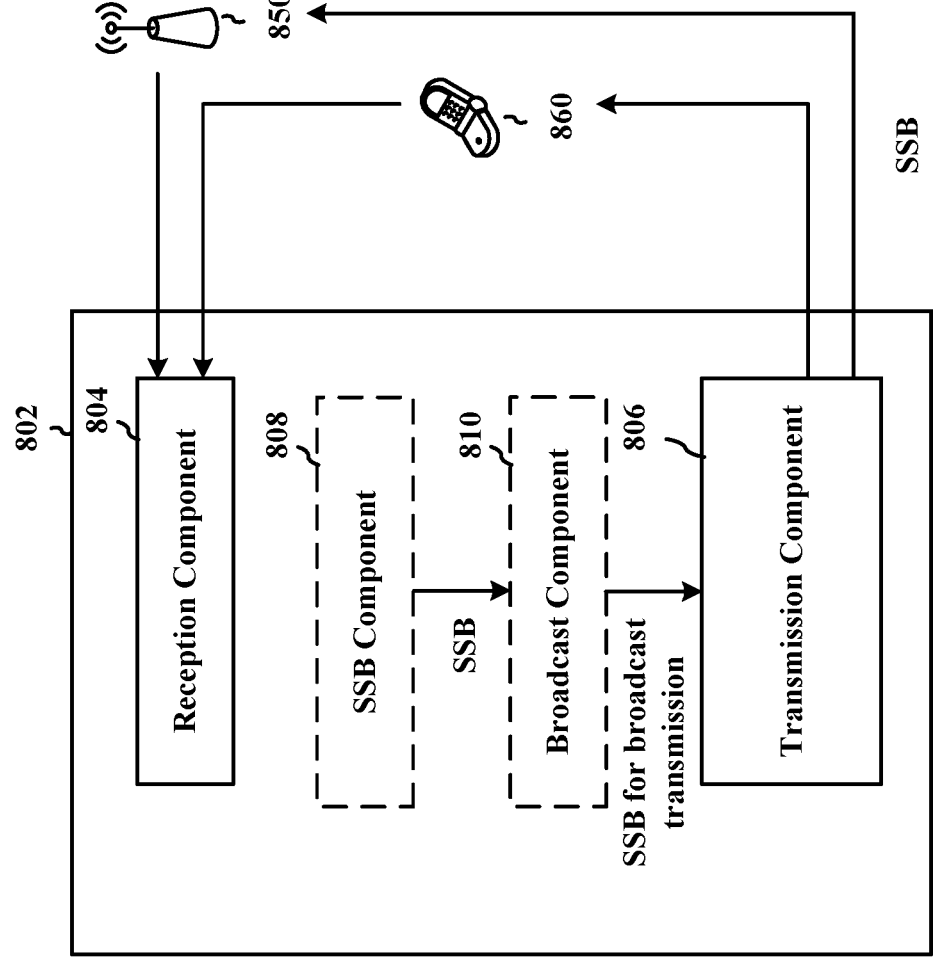
FIG. 8

DISCOVERY SIGNALS FOR MOBILE RELAYS

CROSS REFERENCE TO RELATED APPLICATION(S)

This application claims the benefit of Greek Patent Application Serial No. 20190100400, entitled "DISCOVERY SIGNALS FOR MOBILE RELAYS" and filed on Sep. 16, 2019, which is expressly incorporated by reference herein in its entirety.

BACKGROUND

Technical Field

The present disclosure relates generally to communication systems, and more particularly, to wireless communication involving a mobile relay.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a mobile relay. The apparatus generates a synchronization signal/physical broadcast channel block (SSB) for the mobile relay using at least one of a primary synchronization signal (PSS) for mobile relays that is different than a stationary base station PSS, a secondary synchronization signal (SSS) for the mobile relays that is different than a stationary base station SSS, a physical broadcast channel (PBCH) that is different than a stationary base station PBCH, or a demodulation reference signal (DMRS) associated with the PBCH that is different than a stationary base station DMRS. Then, the apparatus broadcasts the SSB.

In another aspect of the disclosure, a method, a computer-readable medium, and an apparatus are provided for wireless communication at a base station. The apparatus generates assistance information about wireless communication with mobile relays and transmits the assistance information to at least one user equipment (UE).

In another aspect of the disclosure, a method, a computer-readable medium, and an apparatus are provided for wireless communication at a UE. The apparatus receives a SSB and determines whether the SSB is from a mobile relay based, at least in part, on information comprised in the SSB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a diagram of a communication system including mobile relays.

FIG. 7 is a flowchart of a method of wireless communication.

FIG. 8 is a conceptual data flow diagram illustrating the data flow between different means/components in an example apparatus.

DETAILED DESCRIPTION

Figure 1:
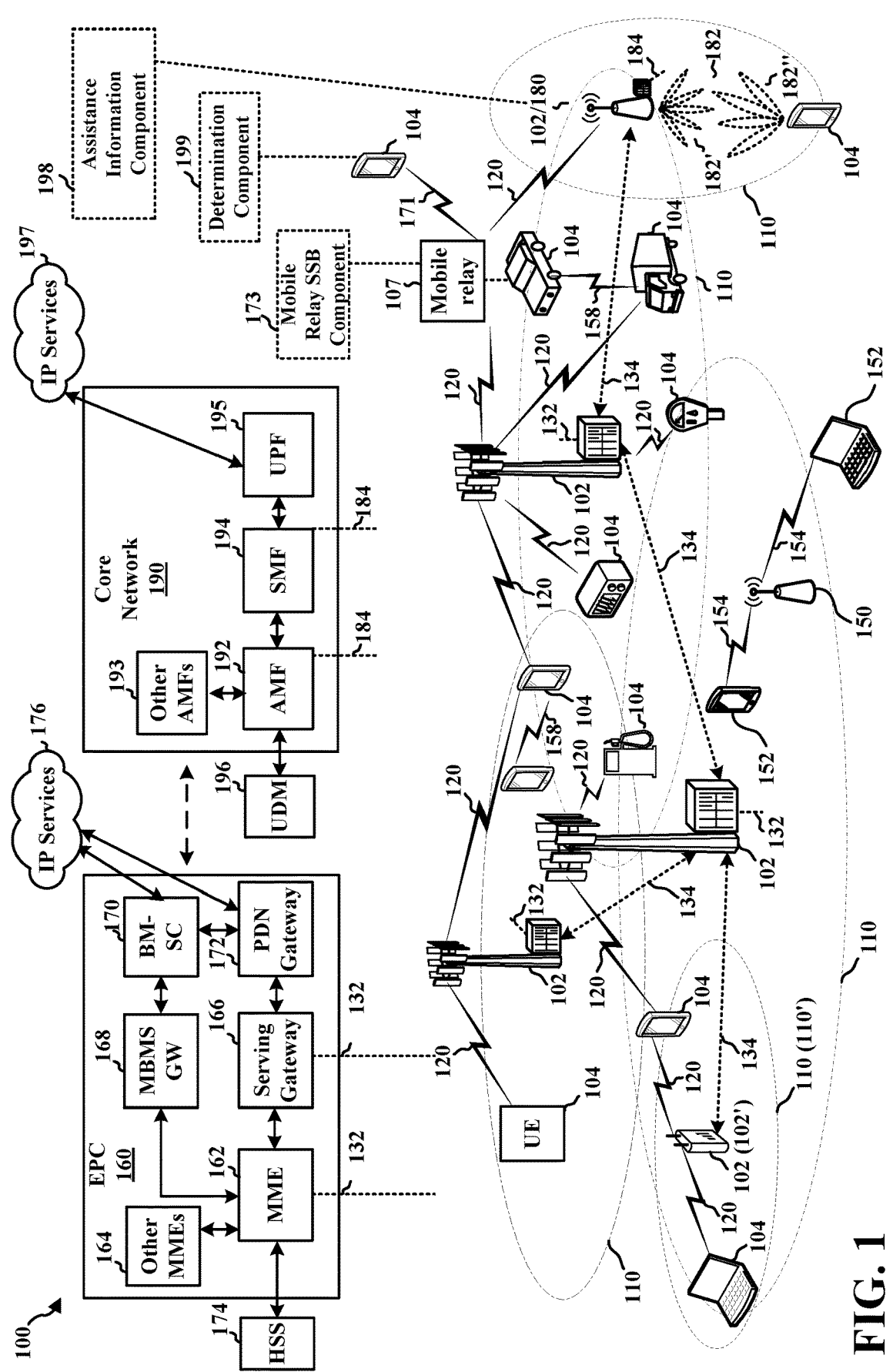
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the base station 180 operates in mmW or near mmW frequencies, the base station 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., base station 180, may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A communication system may include a mobile relay 107, as illustrated in FIG. 1 that relays communication between a UE 104 and a base station, such as base station 102 or 180 using a link 171 between the mobile relay 107 and the UE 104. In some aspects, the mobile relay 107 may include a mobile relay SSB component 173 configured to broadcast a synchronization signal/physical broadcast channel block (SSB) for the mobile relay using at least one of a modified primary synchronization signal (PSS) for mobile relays, a modified secondary synchronization signal (SSS) for mobile relays, a modified physical broadcast channel (PBCH) for mobile relays, a modified downlink modulation reference signal (DMRS) for mobile relays, a particular frequency for mobile relays, etc. The SSB broadcast by the mobile relay 107 may enable a UE to identify the SSB as coming from a mobile relay. In some aspects, the UE 104 may include a determination component 199 configured to determine whether an SSB received by the UE is an SSB from a mobile relay. The determination component 199 may make the determination based, at least in part, on information included in the SSB. In some aspects, a base station 102 or 180 may include an assistance information component 198 configured to transmit assistance information to UE(s) 104 about wireless communication with mobile relays. The assistance information may include PCI information about mobile relays, raster frequencies to search for mobile relays, parameters for cell reselection involving a mobile relay, enabling/disabling a UE from camping on a mobile relay, etc. Although the following description may be focused on 5G NR, the concepts described herein may be applicable to other similar areas, such as LTE, LTE-A, CDMA, GSM, and other wireless technologies.

Figures 2A, 2B, 2C, 2D:
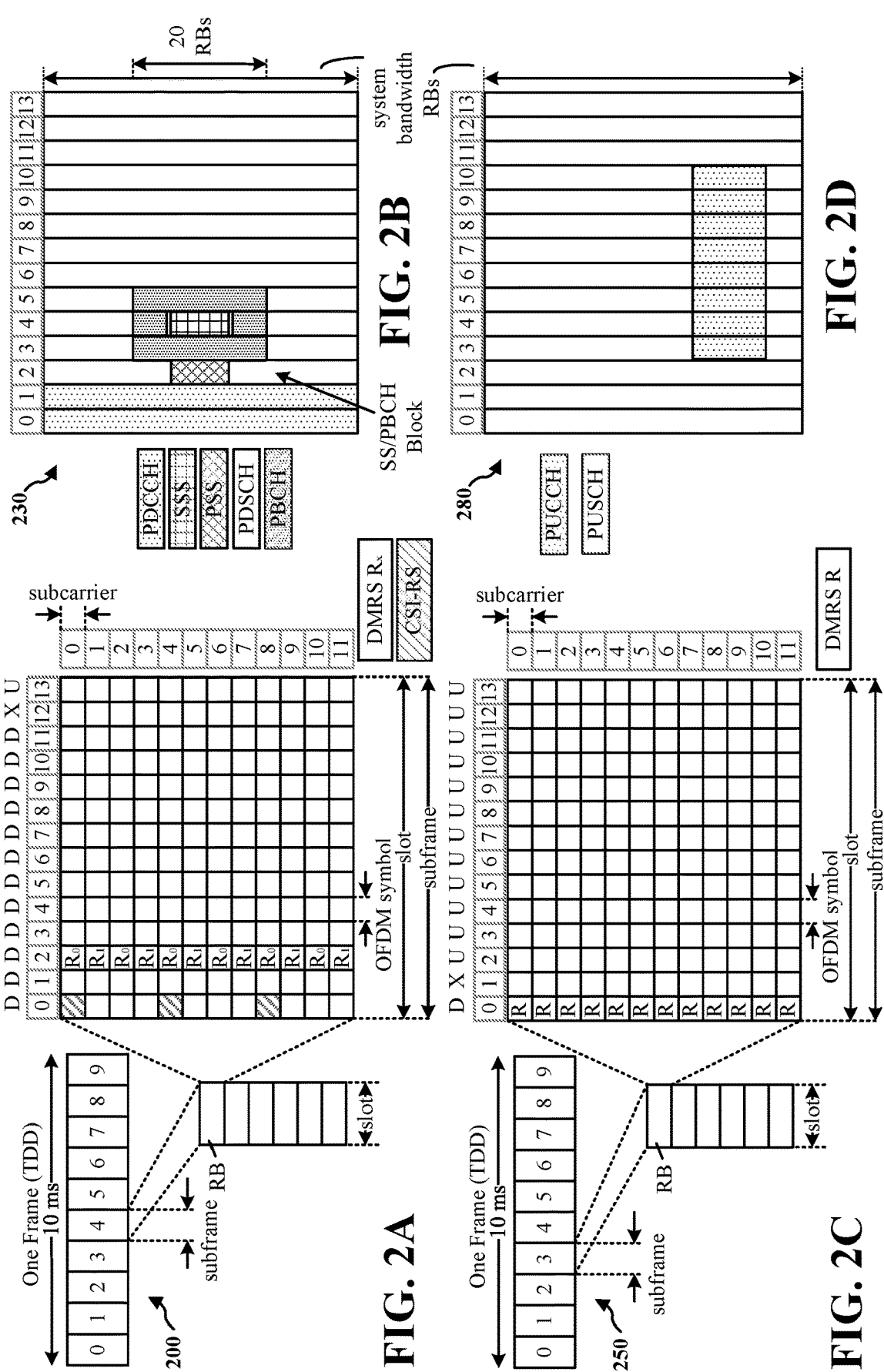
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=0 with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include DMRS (indicated as $R_x$ for one particular configuration, where 100x is the port number, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PSS may be within symbol 2 of particular subframes of a frame. The PSS is used by a UE 104 to determine subframe/symbol timing and a physical layer identity. A SSS may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. The PBCH, which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
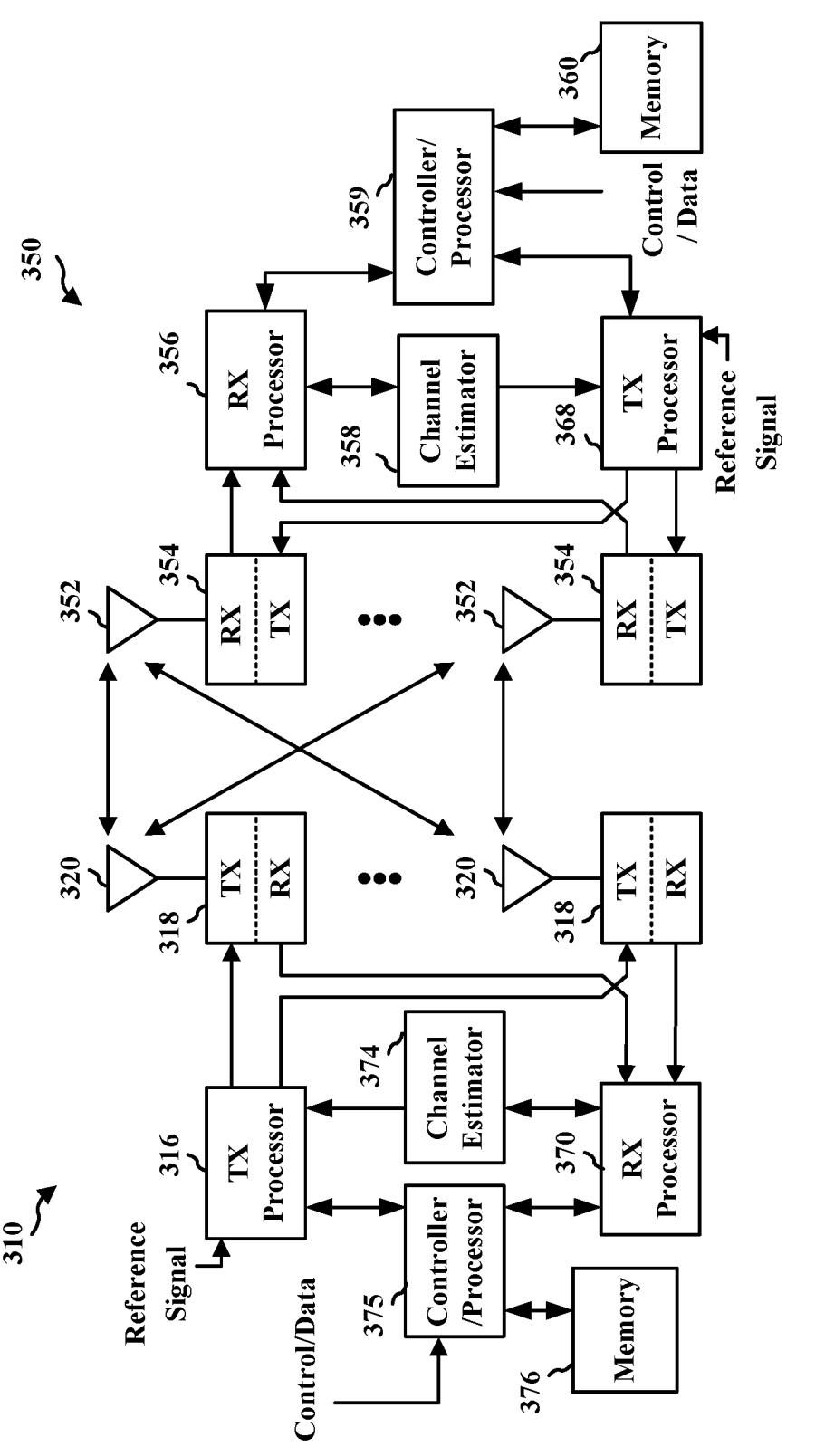
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 198 of FIG. 1.

In some aspects, the components described above with respect to the UE 350 may alternatively be components of a relay, such as a mobile relay, and at least one of the TX processor 368, the RX processor 356, and the controller/processor 359 may be configured to perform aspects in connection with 173 of FIG. 1.

A communication system, such as a 5G NR communication system, may have base stations that have a limited coverage area. The limited coverage area may be due to environmental factors, such as a base station being in a dense urban environment, signals being blocked by terrain, among other examples. Relay nodes may provide additional coverage in the communication system that may not be provided by the base station. Relay nodes relay a signal from the base station and may expand or enhance the serving area of the base station by relaying communication between one or more UEs and the base station. Relay nodes may be used to fill coverage gaps of the serving area of the base station, for example, without installation of an additional base station. A relay node may have a connection to a base station, which may be referred to as a donor base station. As an example, a base station providing coverage for a relay may be referred to as a donor gNB. Once connected, a relay node may relay the signal from the donor base station, thereby expanding or improving the coverage of the base station. Relay nodes may be stationary. In some examples, a relay node may be mobile and may move within the coverage area of the base station or may move out of the coverage area of the base station. For mobile relays, a relay may be located in a vehicle, such as a bus, taxi, train, or car, among others. The mobile relay may provide coverage to neighboring UEs, such as UEs can be in a vehicle where the mobile relay is located or in the vicinity of the vehicle.

FIG. 4 is a diagram of an access network 400 including base stations 402, a UE 406, and mobile relays 404 in accordance with some aspects of the disclosure. In some examples, an access network including mobile relays may be referred to as a fleet network, or a FleetNet system. The mobile relays 404 may be connected to the base station 402, such that the base station 402 is a donor base station (e.g., donor gNB). The radio link, e.g., links 408, between a mobile relay 404 and the base station 402 may be an Uu link 408, such as a link based on Uu NR. The link between a mobile relay 404 and the UE 406 may include a Uu link 408 or a PC5 link 410, such as a link based on PC5 NR. In some aspects, neighboring mobile relays 404 may be configured to communicate with each other via a link 410. The link 410 may be a sidelink link and/or D2D link, and may be based on PC5 NR. A Uu interface may be the radio interface between a mobile device (e.g., a UE) and a radio access network. For example, a Uu interface may include an interface between a UE and a base station for communication between the UE and the network. The Uu interface may include both the user plane and the control plane signaling and/or data streams. In some aspects, messages for the Uu interface may be carried over a D2D link, such as the PC5 link 410. The PC5 link 410 may be configured to carry the signaling and/or messages for the Uu interface in order to provide communication between the UE 406 and the base station 402. PC5 is an example of a D2D link directly between devices that supports communication directly between the devices without passing the communication through a base station. Such a D2D link may support sidelink communication between the two devices.

The mobile nature of mobile relays 404 may lead to challenges in a communication system in which UEs (e.g., the UE 406) use mobile relays 404 to communicate with the network, e.g., with base station 402.

In some examples, a UE 406 may need to perform frequent reselections to a new mobile relay 404. Aspects presented herein may help the UE 406 to search for mobile relays 404 and/or select mobile relays 404 in a more efficient and/or effective manner.

A base station 402 may maintain neighbor lists that contain a list of neighboring cells. There can be different types of neighbor lists. For example, an internal neighbor list may be maintained by the base station 402 with a list of neighboring cells for a particular served cell. A broadcast neighbor list may be broadcast by the base station 402 in the system information block (SIB) for use by UEs 406 in an idle mode. For intra-frequency and inter-frequency cells, the serving cell may not provide an explicit neighbor list and may provide carrier frequency information and bandwidth information only. However, providing an explicit neighbor list (e.g., a list of Physical Cell Identities (PCIs)) per carrier frequency may enable the network to configure cell-specific reselection parameters that can be specified on a per-cell basis. This may include a Q-offset value that biases the reselection either for or against the cell relative to the other cells by modifying its rank. Cells can also be explicitly called out as blacklisted to help a UE 406 avoid reselection to such cells. In another example, a dedicated neighbor list may be sent by the base station 402 to a UE 406, e.g., in a connected mode with the base station 402. The dedicated neighbor list may include a list of PCI per carrier frequency, e.g., having an optional offset for each PCI. Providing the list of PCIs and associated offsets to the UE 406 may help the UE 406 to perform measurements on neighbor cells more quickly.

Base stations may be stationary, so that the list of neighboring cells of neighbor base stations may be relatively fixed. Thus, the neighboring cells that a UE served by the base station is expected to detect for potential handovers may also be relatively fixed. As such, the base station might not send an explicit neighbor list to a UE in an idle mode. However, in wireless communication systems that include mobile relays 404 that provide service to mobile UEs 406, the neighboring relays for the UE 406 may continually change.

A UE 406 in an idle mode may select a cell (whether a base station or a mobile relay) based on a scanning procedure performed by the UE 406. A UE 406 camped on a mobile relay 404 may perform frequent reselections to a new mobile relay 404 due to the mobility of the mobile relay 404 and/or the UE 406. The frequent reselections may expend considerable resources at the UE 406. As presented herein, a base station 402 may provide a neighbor list to a UE 406 in idle mode and camped on a mobile relay 404 to assist in reducing the amount of reselections performed by the UE 406 and/or improving the efficiency of the reselection performed by the UE 406. A base station 402 providing a neighbor list to a UE 406 in a connected mode may also assist in ensuring successful handovers for the UE 406. Aspects presented herein may enable a UE 406 camped on a mobile relay 404 to identify neighboring relays based on assistance information provided by a base station 402. The assistance information may include a neighbor list. The base station 402 may update the assistance information sent to the UE 406 based on the UE's location and/or the locations of the mobile relays 404.

Each cell served by a base station 402 may be dimensioned according to the number of UEs that the cell is expected to serve, and/or based on the density of the area within its coverage area in terms of population. In communication systems that include mobile relays 404, the number of users served by a mobile relay 404, and the number of mobile relays served by a base station 402, might not be accurately predicted due to the mobility of the mobile relays 404 relative to a base station 402 and due to movement of the mobile relays 404 and the UEs 406 relative to each other. Aspects presented herein enable the load of the mobile relay 404 and/or the donor base station 402 to be taken into account prior to a UE 406, in idle mode, reselecting from one mobile relay 404 to another, prior to a mobile relay 404 reselecting from one donor base station 402 to another donor base station, prior to a donor base station 402 handing over a mobile relay to another donor base station, or prior to a UE 406, in a connected mode, being handed over to another mobile relay 404. Mobile relays 404 may have an output power that is lower than the output power of a base station 402. The lower output power of the mobile relays 404 may lead to more frequent handovers for UEs served by the mobile relays 404 than for UEs served by a base station 402.

Each cell may be associated with a particular PCI. For example, cells with a same PCI may be distinguished by an unique Cell Global Identifier (NCGI) of a respective cell. The PCI may be carried by PSS/SSS in a SSB block from the cell. The PCI may be used to determine the scrambling sequence of physical signals or physical channels transmitted by the cell. As an example, any of a Physical Broadcast Channel (PBCH), a PDCCH (e.g., PDCCH CoreSet0), a cell-specific PDSCH transmission, etc. from the cell may be scrambled based on the PCI for the cell. For example, the PCI may be used as a scrambling seed for scrambling the channels. Other channels may be scrambled based on another scrambling seed. The number of possible PCI values may be limited, and a PCI may be reused across a network. In some examples, PCI values may be reused by multiple geographically separated cells in a network. In a network with stationary cells, PCI planning or network planning may be used, e.g., by a self-organizing network (SON) to avoid PCI collisions.

A mobile relay 404 having a particular PCI may come into proximity with another cell having the same PCI. As signals from the mobile relay node 404 and the other cell may both be scrambled based on the same PCI, a UE 406 receiving the signals may not be able to correctly identify the source of the signal, e.g., may be unable to differentiate between a signal from the mobile relay 404 and a signal from the other cell. The use of a same PCI value by the mobile relay 404 and another cell within proximity of the mobile relay may be referred to as a PCI collision. PCI collision may lead to issues with timing synchronization and channel estimation, and may further cause decoding failures for data traffic transmitted from at least one of these two neighboring cells.

The present disclosure provides aspects that may be used to address the potential for PCI collision. Additionally or alternately, aspects presented herein may help to avoid having UEs without mobile relay capability from camping on a mobile relay. Such UEs that do not support communication with mobile relays may utilize additional procedures that are provided by a base station or a stationary relay but are not provided by a mobile relay.

Aspects presented herein may include the mobile relay 404 broadcasting a channel or signal that enables UEs to differentiate between a mobile relay 404 and a base station 402.

Information for determining a PCI may be carried in a combination of a PSS and an SSS. For example, NR includes 1008 unique PCIS given by $N_{ID}^{cell} = 3N_{ID}^{(1)} + N_{ID}^{(2)}$, where $N_{ID}^{(1)} \in \{0, 1, \ldots, 335\}$ and $N_{ID}^{(2)} \in \{0, 1, 2\}$. The mobile relay 404 may use a modified PSS and/or SSS for mobile relays. Modified PSS/SSS may refer to a PSS/SSS that is different than a PSS/SSS for base stations, stationary relays, etc.

In some aspects, the mobile relay 404 may use a PSS sequence for mobile relays that is different than a PSS sequence used by base stations, stationary relays, etc. As an example of a different PSS sequence, the mobile relay 404 may use a different register initialization for initializing a register for generating the PSS sequence. A base station [x(6) x(5) x(4) x(3) x(2) x(1) x(0)]=[1 1 1 0 1 1 0], may use and the mobile relay 404 may use a different set value to initialize the register as a part of generating the PSS sequence for the mobile relay 404. Additionally or alternately, the mobile relay 404 may modify the way that the register is mapped to a physical symbol. For example, the mobile relay 404 may use a different value to map the output registry to the sequence (value of m), e.g., mobile relays may use $m = (2n + 43N_{ID}^{(2)}) \bmod 127$, and a base station may use $m = (n + 43N_{ID}^{(2)}) \bmod 127$. Additionally or alternately, the mobile relay 404 may use a different registry update rule than a base station. For example, a base station may use $x(i+7) = (x(i+4) + x(i)) \bmod 2$, and the mobile relay 404 may use a different registry update rule for mobile relays.

In some aspects, the mobile relay 404 may use a different placement of the PSS and/or the SSS within the SSB that a base station. For example, the mobile relay 404 may use a different relative location between the PSS and the SSS. For example, base stations 402 may map the PSS to a first symbol of the SSB, and may map the SSS to a third symbol of the SSB. Mobile relays 404 may exchange the position of the PSS and the SSS, so that the SSS may be mapped to the first symbol of the SSB and the PSS may be mapped to the third symbol of the SSB.

In some aspects, the mobile relay 404 may use a different SSS sequence than an SSS sequence for base stations or stationary relays. As described in connection with the example involving a different PSS sequence, mobile relays may generate an SSS sequence using different values and/or different functions than those applied by base stations or stationary relays in generating the SSS sequence.

A UE receiving an SSB may determine that the received SSB is from a relay device based on the SSB including the modified PSS/SSS, e.g., rather than from a base station or other stationary device. The modified PSS/SSS may also help to avoid discovery by a UE that does not support mobile relays, e.g., a legacy UE. The modification of the PSS/SSS may cause such UEs to be unable to decode the PSS/SSS of the mobile relay 404. Additionally, the modification of the modified PSS/SSS may provide a PCI space for mobile relays 404 that is separate from the PCI space for base stations 402. This may enable the devices to use separate PCI pools without requiring a reduction in the number of potential PCIs for base stations by providing additional PCI space for mobile relays 404.

In some aspects, the mobile relay 404 may use a modified PBCH for mobile relays or a modified DMRS for mobile relays, the modified PBCH or modified DMRS being different than a PBCH or DMRS used by base stations. In some examples, the mobile relay 404 may use a same PSS/SSS structure as the base station, and the modified PBCH or modified DMRS may help to identify the device as a mobile relay 404. Similar to the example using a modified PSS/SSS, the modified PBCH or modified DMRS may help to avoid discovery by UEs that do not support mobile relays. In some aspects, the modified PBCH for mobile relays may use a different PBCH scrambling than a PBCH for a base station. For example, a base station 402 may use a scrambling initialization based on $c_{init} = N_{ID}^{cell}$, whereas a mobile relay 404 may use a different scrambling initialization, such as $c_{init} = N_{ID}^{cell} + 1$. Additionally or alternately, a base station 402 may scramble the bits of the PBCH prior to modulation according to $\tilde{b}(i) = (b(i) + c(i + \nu M_{bit})) \bmod 2$ wherein the scrambling sequence $c(i)$ is periodically initialized with $c_{init}$. A mobile relay 404 may scramble the bits of the PBCH prior to modulation according to $\tilde{b}(i) = (b(i) + c(i + \nu M_{bit} + 1)) \bmod 2$. The PBCH may have an associated DMRS. In some aspects, the mobile relay may use a modified DMRS for mobile relays that is different than a DMRS for base stations. The mobile relay 404 may generate the PBCH in the same manner as a base station, and the modified DMRS may identify the device as a mobile relay. For example, a DMRS scrambling that is specific to mobile relays may be used for the DMRS associated with the PBCH of the mobile relay 404. A UE 406 receiving the SSB may identify the device that transmitted the SSB as a mobile relay 404 based on the modified PBCH and/or the modified DMRS.

In some aspects, the PCI space may provide a separate PCI pool for mobile relays 404. For example, the PCI space may be increased (e.g., with respect to a legacy PCI space) to provide the separate PCI pool for mobile relays 404. A UE may identify the device as a mobile relay based on the mobile relay's PCI being within the PCI pool for mobile relays. The PCI pool may be increased in a number of ways. In some examples, the PCI pool may be increased (e.g., relative to a legacy PCI space) by increasing a number of SSS sequences. The increased number of SSS sequences may correspond to an increased number of hypotheses relative to a number of hypotheses for a stationary base station. If a UE detects a mobile relay PSS, the UE may run the larger number of hypotheses for the SSS. In some aspects, the PCI pool may be increased (e.g., relative to a legacy PCI space) by including PCI information for mobile relays in a PBCH or in a PBCH DMRS. For example, if a UE detects a PSS and/or an SSS that is for a mobile relay, the UE may run additional hypotheses for PBCH scrambling when attempting to decode a received PBCH from the mobile relay. Additionally or alternately, if the UE detects a PSS and/or an SSS that is for a mobile relay, the UE may run additional hypotheses for PBCH DMRS scrambling when attempting to decode a received PBCH DMRS from the mobile relay. In some aspects, the PCI pool may be increased for mobile relays (e.g., relative to a legacy PCI space) by adding an additional signal or channel that indicates information about the PCI for the mobile relay. For example, the mobile relay may transmit an additional synchronization signal, in addition to the PSS and the SSS. The additional synchronization signal may be referred to as a tertiary synchronization signal (TSS). The PCI may be derived based on the PSS, the SSS, and the TSS. As an example, if a TSS includes 10 possible values, the PCI may be derived based on $N_{ID}^{cell} = 1008 N_{ID}^{(3)}$, $+3 N_{ID}^{(1)}$, $+N_{ID}^{(2)}$. The use of a TSS having 10 possible values may increase the PCI space by a factor of 10. The DMRS scrambling and/or the PBCH scrambling for the SSB may be based on the PCI that depends on the PSS, the SSS, and the TSS.

In some aspects, particular raster frequencies may be used by mobile relays. A UE may search for an SSB from a cell in a subset of possible center frequencies that may be referred to as raster frequencies. The raster frequency may be different for different frequency bands. The raster frequencies used by the UE to search for SSBs from mobile devices (e.g., mobile relays) may be different than the raster frequencies that the UE uses to search for SSBs from base stations. For example, the UE may search for SSB from mobile relays by applying a raster offset to the raster frequencies that the UE uses to search for base stations. An example raster offset may include a 30 kHz offset. 30 kHz is merely an example, and other offsets may be used by the UE. A base station may indicate the raster offset to the UE to use in searching for mobile relays.

In some aspects, a subset of possible PCI values for base stations may be used for mobile relays. A base station may signal the subset of possible PCI values to the UE. Then, if a UE detects a PCI in the signalled subset of PCI values, the UE may attempt to detect additional information to determine whether the PCI is for a mobile relay or for a base station. For example, the base station may indicate in a SIB that PCI values 0 to 10 may be used for mobile relays. If the UE detects a PSS/SSS from a device corresponding to a PCI within values 0-10, the UE may attempt to obtain additional information from the device to derive an extended PCI. For example, the UE may attempt to obtain additional information about the PCI in a TSS, PBCH or PBCH DMRS from the device. Additionally or alternatively, the UE may attempt to obtain additional information about the PCI from an additional synchronization signal, e.g., a TSS. If the additional PCI information is carried in a TSS, the PBCH or the PBCH DMRS may be scrambled based on the extended PCI or may be scrambled based on the PCI information carried in the PSS and the SSS.

A UE that supports mobile relays may perform a significant amount of computation to blindly detect both non-mobile relay sequences and mobile relay sequences. A base station, such as a macro base station, may signal information to the UE about frequencies for the UE to search for a mobile relay SSB. For example, the base station may signal the information in system information, such as a SIB. The information about frequencies may indicate one or more frequency bands or a E-UTRA Absolute Radio Frequency Channel Number (EARFCN), etc. Within the indicated frequencies, the UE may search for SSBs from mobile relays, e.g., without searching for SSBs from a base station. For example, if the mobile relays communicate using an overlapping frequency with a base station, such as a same frequency, the frequency location of the SSBs for the mobile relays may be different than the frequency location of the SSB for the base station. The use of separate frequency locations may help a UE to avoid multiple searches. For example, the UE may perform blind detection for mobile relay sequences (e.g., but not for non-mobile relay sequences) on the frequencies signaled as corresponding to the SSBs for mobile relays, and may perform blind detection for non-mobile relay sequences (e.g., but not for mobile relay sequences) on other frequencies.

A UE may apply different cell reselection parameters when reselecting to a mobile relay, or reselecting from one mobile relay to another mobile relay, than the UE applies to reselect to a base station. A base station may provide the UE with the different cell reselection parameters for reselecting to a mobile relay than for reselecting to a base station. The base station may determine the UE's reselection parameters for mobile relays based on traffic of the UE, a mobility of the UE, etc.

A UE in a connected mode with a base station may receive control information from the base station. In some aspects, the UE may report that the UE supports communication with mobile relays. Based on the UE's support for communication with mobile relays, the base station may configure different measurement procedures, different triggers, etc., for reselection to mobile relays. In some aspects, the base station may respond to the UE's indication of support for communication with mobile relays by indicating that the base station does not support communication with mobile relays. This indication may also be implicit based on a lack of indication of support of communication with mobile relays. If the UE receives such an indication from the base station, the UE may determine not to measure mobile relay cells and/or to not report measurements for mobile relay cells to the base station. When a UE reports measurements for a mobile relay to a base station, the UE may indicate to the base station that the reported measurements are for a mobile relay.

In some aspects, a UE may report potential targets for a handover to a base station based on, e.g., measurement reports. The base station may indicate to the UE that one or more of the potential targets for a conditional handover is a mobile relay.

A base station may provide a UE with a trigger for use in performing a conditional handover. If the trigger occurs, e.g., a signal measurement for a new cell is above a threshold, etc., the UE may move to the new cell without further instructions from the base station. The base station may determine that the target for a conditional handover is a mobile relay, and may provide the UE with a trigger for conditional handover that is specific to mobile relays and/or that is different from a trigger for a conditional handover to another base station.

Figure 5:
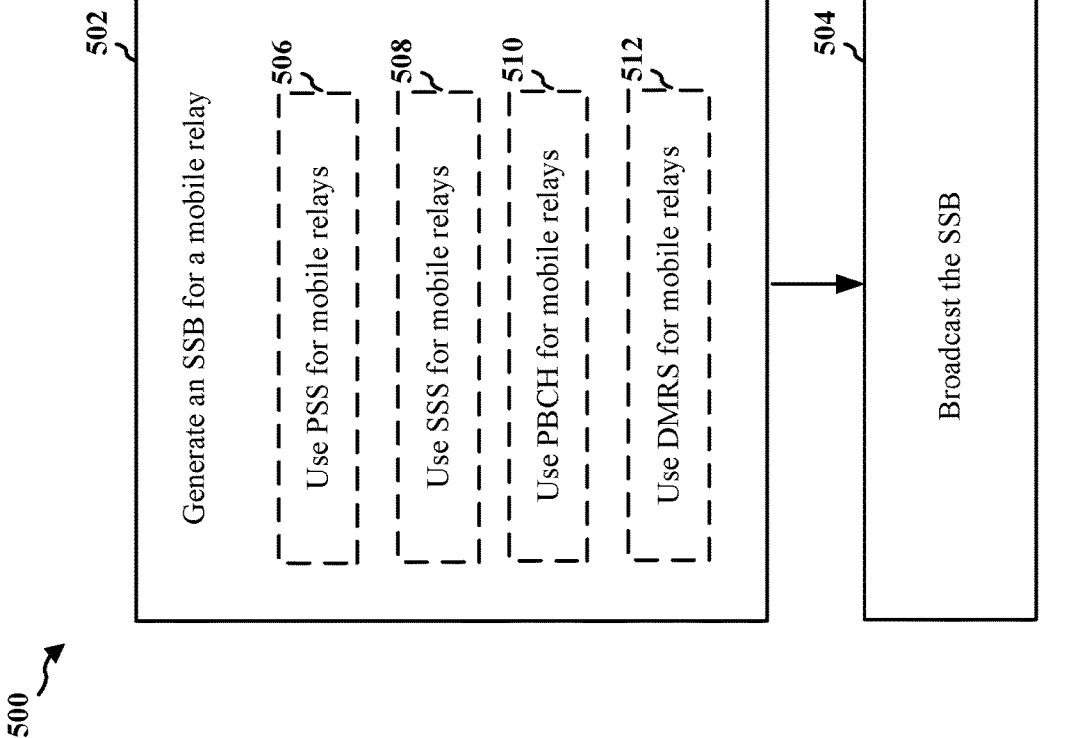
FIG. 5 is a flowchart of a method of wireless communication.

FIG. 5 is a flowchart 500 of a method of wireless communication. The method may be performed by a mobile relay or a component of a mobile relay (e.g., the mobile relay 107, 404; the apparatus 802/802'; a processing system 814, which may include the memory and which may be the entire mobile relay or a component of the mobile relay, such as TX processor, RX processor, and/or controller/processor).

At 502, the mobile relay generates a SSB for the mobile relay using at least one of a PSS for mobile relays that is different than a stationary base station PSS, as illustrated at 506; an SSS for mobile relays that is different than a stationary base station SSS, as illustrated at 508; a PBCH that is different than a stationary base station PBCH, as illustrated at 510; or a DMRS associated with the PBCH that is different than a stationary base station DMRS. The SSB may help a receiving device to identify that the SSB is sent by a mobile relay The mobile relay may use a PSS for mobile relays that is different than the stationary base station PSS or the SSS for mobile relays that is different than the stationary base station SSS. For example, the mobile relay may use a PSS sequence that is different than a stationary base station PSS sequence, as illustrated at 506. For example, the PSS sequence used by the mobile relay may be based on at least one of: an initialization of a register for mobile relays, a mapping of the register to a physical sequence for the mobile relays, or a registry update rule for the mobile relays. For example, the mobile relay may use a symbol placement for the PSS or the SSS that is different than a stationary base station symbol placement. For example, the mobile relay may map the SSS to a first symbol in and the PSS to a third symbol in the SSB. For example, the mobile relay may use an SSS sequence that is different than a stationary base station SSS sequence, as illustrated at 508.

The mobile relay may use a PBCH that is different than a stationary base station PBCH, as illustrated at 510. For example, the mobile relay may apply a different scrambling to the PBCH than the stationary base station PBCH. The different scrambling may include at least one of a different function for a scrambling initialization than the stationary base station PBCH or a different function for applying the scrambling to the PBCH than the stationary base station PBCH. The mobile relay may apply a different scrambling to the DMRS associated with the PBCH, e.g., as illustrated at 512.

A PCI for the mobile relay may be from a PCI pool for mobile relays that is larger than a stationary base station PCI pool. The PCI pool for mobile relays may include a set of SSS sequences that is larger than a stationary base station set of SSS sequences. The PCI for the mobile relay may be indicated based on the PSS, the SSS, and at least one of the PBCH or the DMRS. The PCI for the mobile relay may be indicated based on the PSS, the SSS, and an additional synchronization signal. The scrambling for the PBCH or the DMRS may be based on the PCI indicated by the PSS, the SSS, and the additional synchronization signal.

At 504, the mobile relay broadcasts the SSB. The mobile relay may transmit the SSB using a particular frequency for mobile relays. For example, the mobile relay may use at least one raster frequency from a set of raster frequencies for mobile relays. The at least one raster frequency may be based on a raster offset in frequency for mobile relays.

Figure 6:
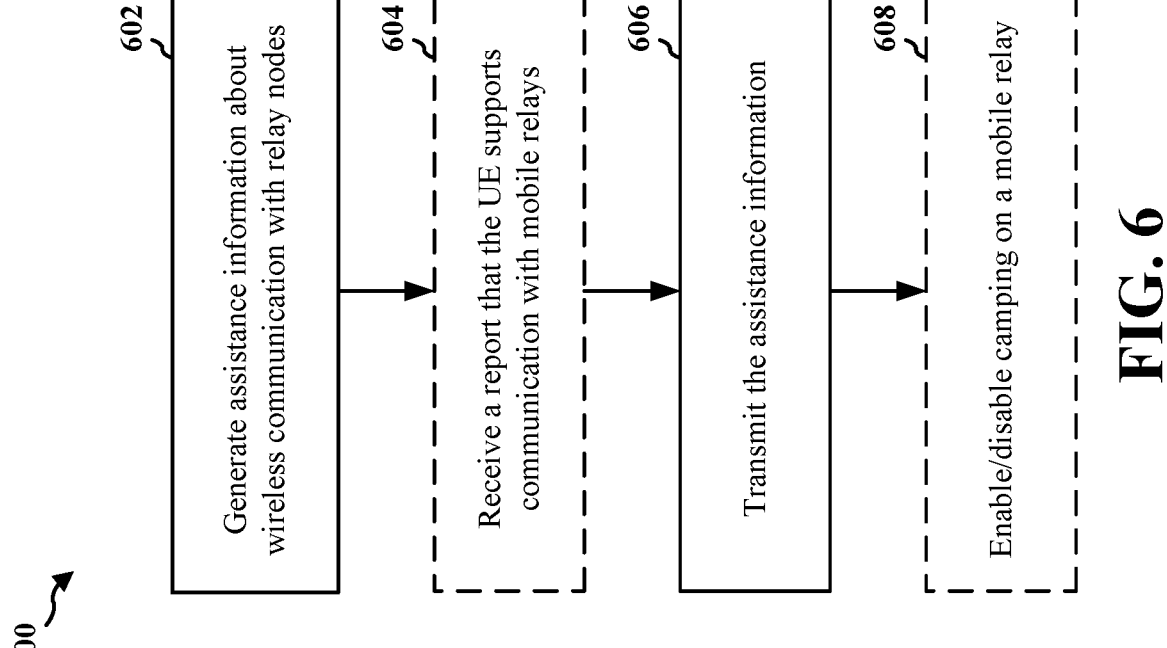
FIG. 6 is a flowchart of a method of wireless communication.

FIG. 6 is a flowchart 600 of a method of wireless communication. The method may be performed by a base station or a component of a base station (e.g., the base station 102, 180, 310, 402; the apparatus 1002/1002' a processing system 1114, which may include the memory and which may be the entire base station 310 or a component of the base station 310, such as TX processor 316, RX processor 370, and/or controller/processor 375).

At 602, the base station generates assistance information about wireless communication with mobile relays. The information may indicate a set of PCIs for the mobile relays, wherein the set of PCIs comprises a subset of PCIs for stationary base stations. The assistance information may include one or more frequencies for the at least one UE to use to search for a mobile relay. The assistance information may include one or more parameters for cell reselection involving a mobile relay.

The assistance information may enable or disable the at least one UE from camping on a mobile relay. As illustrated at 608, the base station may determine whether to enable or disable the at least one UE from camping on the mobile relay based on traffic for the at least one UE or a mobility of the at least one UE.

At 606, the base station transmits the assistance information to at least one UE.

As illustrated at 604, the base station may receive a report from a UE that the UE supports communication with the mobile relays. The assistance information may be transmitted to the UE, at 606, in response to the report. The assistance information may include at least one of a first indication of whether the base station supports the communication with the mobile relays, a second indication that a potential handover target for the UE is a mobile relay, or a trigger for a conditional handover to the mobile relay.

FIG. 7 is a flowchart 700 of a method of wireless communication. The method may be performed by a UE or a component of a UE (e.g., the UE 104, 350, 406; the apparatus 1202/1202'; a processing system 1314, which may include the memory 360 and which may be the entire UE 350 or a component of the UE 350, such as the TX processor 368, the RX processor 356, and/or the controller/processor 359).

At 714, the UE receives an SSB. At 718, the UE determines whether the SSB is from a mobile relay based, at least in part, on information comprised in the SSB. The UE may determine that the SSB is from the mobile relay based on the SSB comprising a modified PSS for mobile relays that is different than a stationary base station PSS. The UE may determine that the SSB is from the mobile relay based on the SSB comprising a modified SSS for mobile relays that is different than a stationary base station SSS. The UE may determine that the SSB is from the mobile relay based on the SSB comprising a modified PBCH that is different than a stationary base station PBCH. The UE may determine that the SSB is from the mobile relay based on the SSB comprising a modified DMRS associated with the PBCH that is different than a stationary base station DMRS. The UE may determine that the SSB is from the mobile relay based on the SSB being transmitted in a raster frequency for mobile relays.

At 708, the UE receives frequency information from a base station for monitoring for an SSB from mobile relays. For example, the UE may receive from a base station, an indication of raster frequencies associated with mobile relays and comprising the raster frequency. The UE may receive, from the base station, one or more frequencies for the UE to use to search for mobile relays. The UE may determine whether the SSB is from the mobile relay, at 718, based on whether the SSB is received within the one or more frequencies.

At 706, the UE may receive, from a base station, a set of PCIs for mobile relays. The set of PCIs may include a subset of PCIs for stationary base stations. At 716, the UE may determine that a PCI based on a PSS and a SSS comprised in the SSB is in the set of PCIs for the mobile relays. At 718, the UE may use additional information to determine whether the SSB is from the mobile relay. The additional information may include a PBCH comprised in the SSB or a DMRS associated with the PBCH. The additional information may include an additional synchronization signal comprised in the SSB.

At 710, the UE may receive, from a base station, one or more parameters for cell reselection involving mobile relays. At 722, the UE may use the one or more parameters to perform cell reselection when the UE determines that the SSB is received from the mobile relay.

At 702, the UE transmits a report, to a base station, indicating that the UE supports communication with mobile relays. At 704, the UE may receive, assistance information from the base station in response to the report. The assistance information may include at least one of a first indication of whether the base station supports the communication with the mobile relays, a second indication that a potential handover target for the UE is the mobile relay, or a trigger for a conditional handover to the mobile relay. At 712, the UE may receive, from a base station, a signal enabling or disabling the UE from camping on mobile relays.

At 720, the UE may report a measurement based on the SSB to the base station and indicates that the measurement is for the mobile relay, when the UE determines that the SSB is from the mobile relay.

FIG. 8 is a conceptual data flow diagram 800 illustrating the data flow between different means/components in an example apparatus 802. The apparatus may be a mobile relay or a component of a mobile relay. The apparatus may include a reception component 704 configured to receive communication from a base station 750 and/or a UE 760. The apparatus may include an SSB component 808 configured to generate an SSB for the mobile relay. The SSB component 808 may use at least one of a PSS for mobile relays that is different than a stationary base station PSS, an SSS for the mobile relays that is different than a stationary base station SSS, a PBCH that is different than a stationary base station PBCH, or a DMRS associated with the PBCH that is different than a stationary base station DMRS. The apparatus may include a broadcast component 810 configured to broadcast the SSB, e.g., via the transmission component 806. A UE 760 may receive the SSB and may establish a connection with the mobile relay. The mobile relay may also communicate with a base station 750, e.g., as described in connection with FIG. 4.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
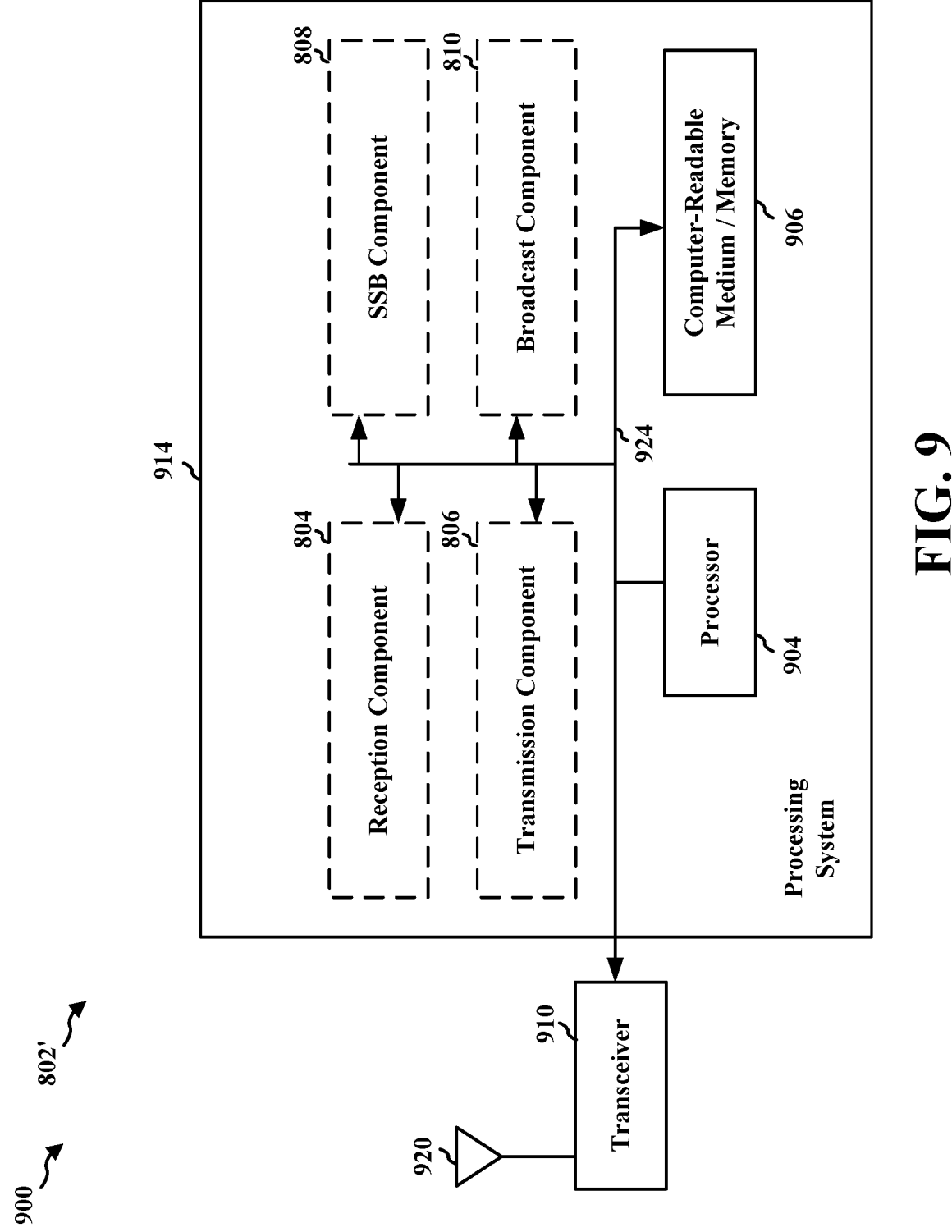
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810. The components may be software components running in the processor 904, resident/stored in the computer readable medium/memory 906, one or more hardware components coupled to the processor 904, or some combination thereof. The processing system 914 may be a component of the mobile relay and may include the memory and/or at least one of a TX processor, the RX processor, or the controller/processor. Alternatively, the processing system 914 may be the entire mobile relay.

In one configuration, the apparatus 802/802' for wireless communication includes means for generating an SSB for the mobile relay. The means for generating the SSB may use at least one of a PSS for mobile relays that is different than a stationary base station PSS, an SSS for the mobile relays that is different than a stationary base station SSS, a PBCH that is different than a stationary base station PBCH, or a DMRS associated with the PBCH that is different than a stationary base station DMRS. The apparatus may include means for broadcasting the SSB. The aforementioned means may be one or more of the aforementioned components of the apparatus 802 and/or the processing system 914 of the apparatus 802' configured to perform the functions recited by the aforementioned means. As described supra, the processing system 914 may include a TX Processor, an RX Processor, or the controller/processor. As such, in one configuration, the aforementioned means may be the TX Processor, the RX Processor, and/or the controller/processor configured to perform the functions recited by the aforementioned means.

Figure 10:
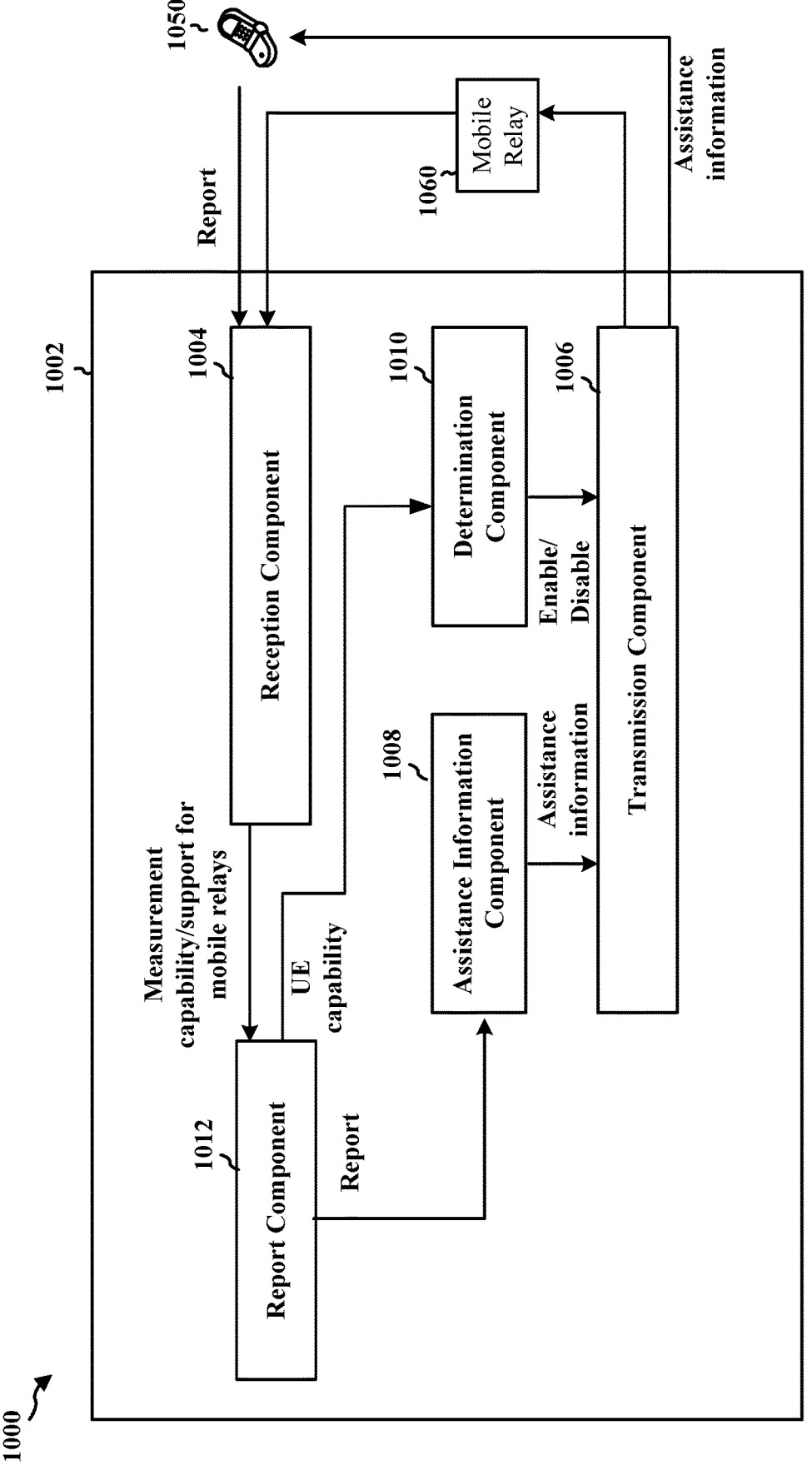
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a base station or a component of a base station. The apparatus includes a reception component 1004 that receives uplink communication from one or more UEs 1050 and/or mobile relays 1060. The apparatus may include an assistance information component 1008 configured to generate assistance information about wireless communication with mobile relays, e.g., as described in connection with 602 in FIG. 6. The apparatus may include a transmission component 1006 configured to transmit the assistance information to at least one UE 1050, e.g., as described in connection with 606 in FIG. 6. The apparatus may include a determination component 1010 configured to determine whether to enable or disable the at least one UE from camping on the mobile relay based on traffic for the at least one UE or a mobility of the at least one UE, e.g., as described in connection with 608 in FIG. 6. The apparatus may include a report component 1012 configured to receive a report from a UE that the UE supports communication with the mobile relays, wherein the assistance information is transmitted to the UE in response to the report, e.g., as described in connection with 604 in FIG. 6.

The apparatus may include additional components that perform each of the blocks of the algorithm in the aforementioned flowchart of FIG. 6. As such, each block in the aforementioned flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
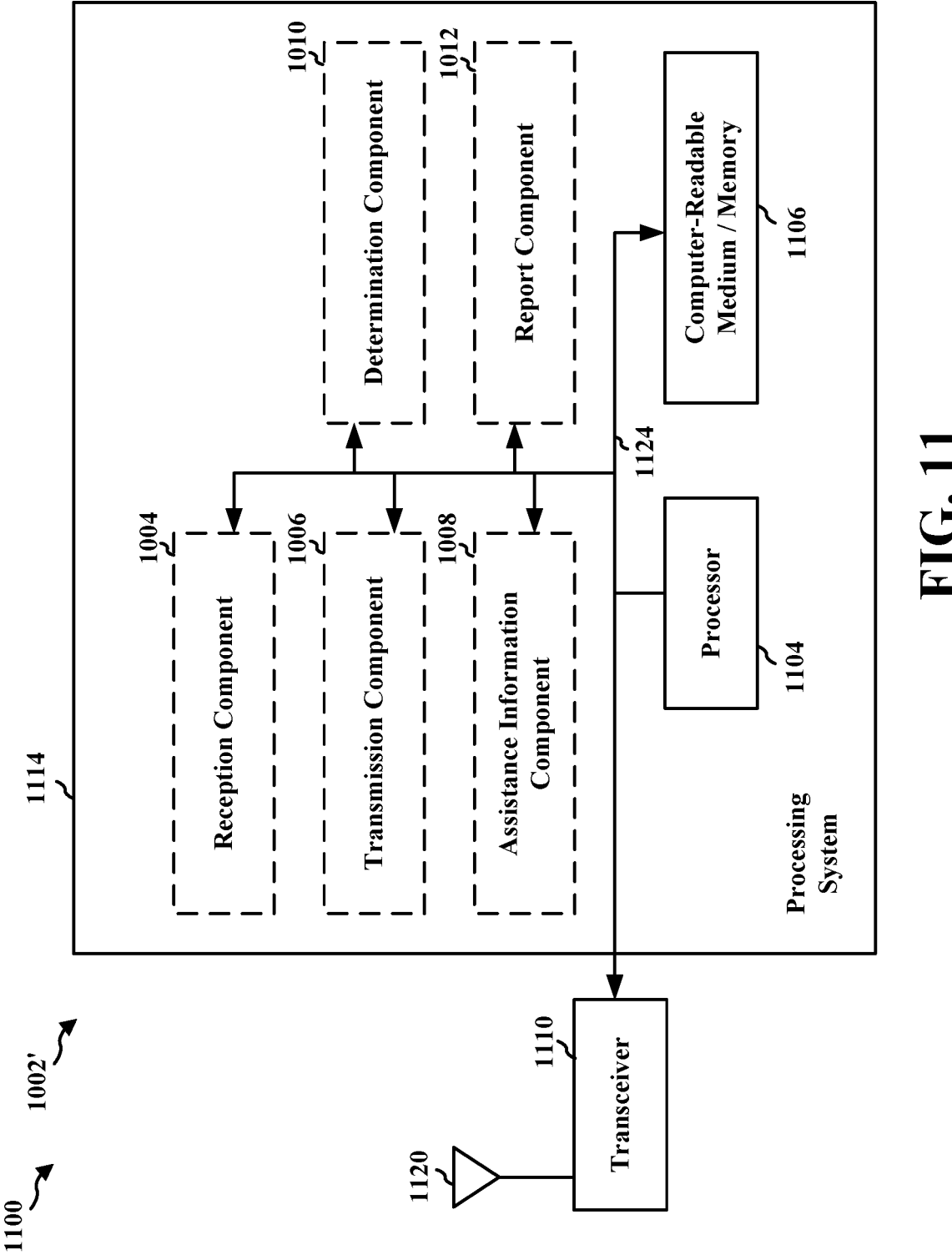
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012.

The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the apparatus 1002/1002' for wireless communication includes means for generating assistance information about wireless communication with mobile relays and means for transmitting the assistance information to at least one UE. The apparatus may include means for determining whether to enable or disable the at least one UE from camping on the mobile relay based on traffic for the at least one UE or a mobility of the at least one UE. The apparatus may include means for receiving a report from a UE that the UE supports communication with the mobile relays, wherein the assistance information is transmitted to the UE in response to the report. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
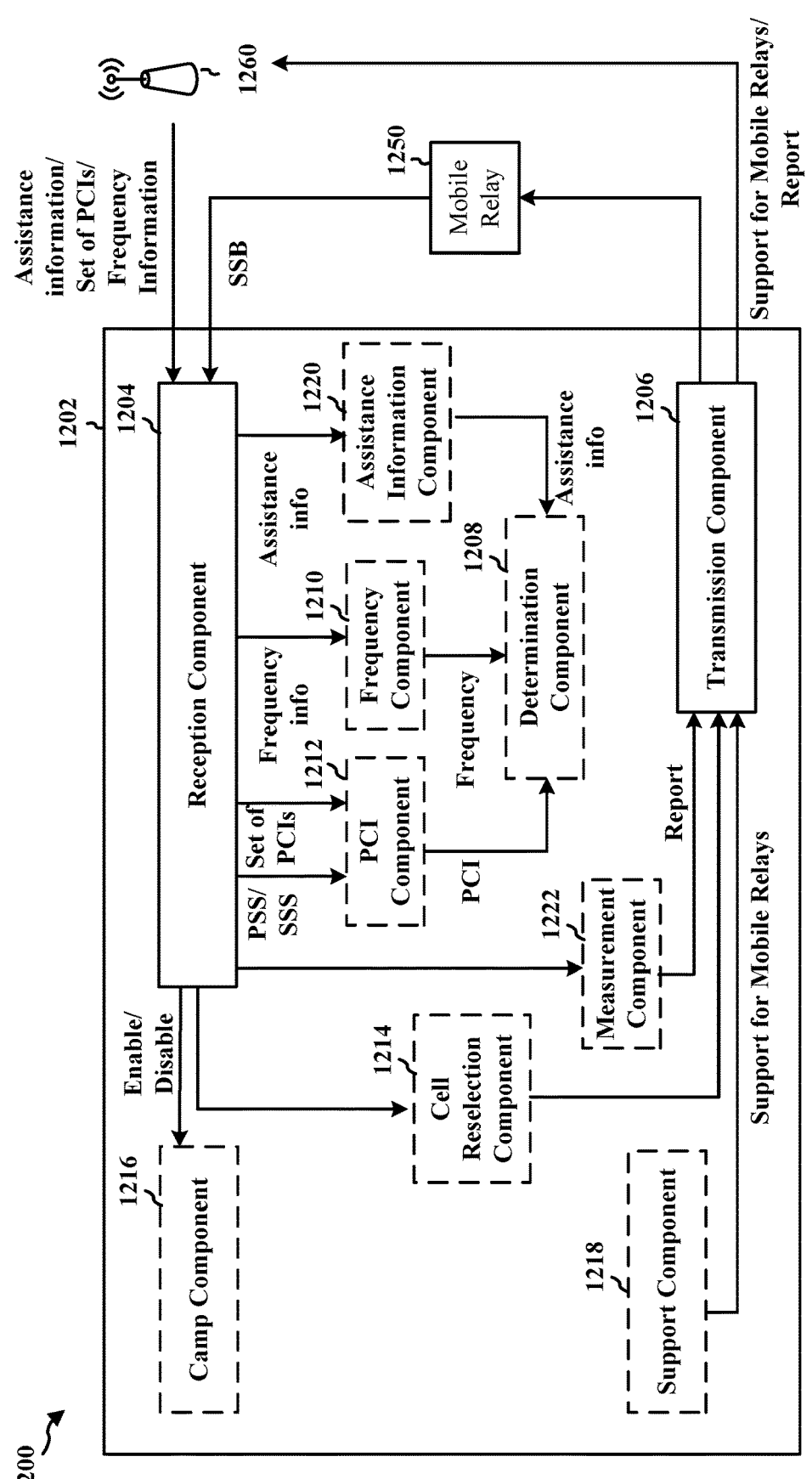
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a UE or a component of a UE. The apparatus may include a reception component 1204 configured to receive an SSB, e.g., as described in connection with 714 in FIG. 7. The apparatus may include a determination component 1208 configured to determine whether the SSB is from a mobile relay 1250 based, at least in part, on information comprised in the SSB, e.g., as described in connection with 718 in FIG. 7. The apparatus may include a frequency component 1210 configured to receive, from a base station 1260, frequency information associated with the mobile relays, e.g., as described in connection with 708 in FIG. 7. The reception component 1204 may be configured to receive, from a base station, a set of PCIs for mobile relays, as described in connection with 706 in FIG. 7. The apparatus may include a PCI component 1212 configured to determine that a PCI based on a PSS and a SSS comprised in the SSB is in the set of PCIs for the mobile relays, e.g., as described in connection with 716 and 718 in FIG. 7. The determination component 1208 may be configured to use additional information to determine whether the SSB is from the mobile relay, based on the determination by the PCI component 1212, as described in connection with 716 in FIG. 7.

The reception component 1204 may be configured to receive, from a base station, one or more parameters for cell reselection involving mobile relays, as described in connection with 710 in FIG. 7. The apparatus may include a cell reselection component 1214 configured to use the one or more parameters to perform the cell reselection when the UE determines that the SSB is received from the mobile relay, e.g., as described in connection with 722 in FIG. 7. The apparatus may include a camp component 1216 configured to receive, from a base station, a signal enabling or disabling the UE from camping on mobile relays, e.g., as described in connection with 712 in FIG. 7. The apparatus may include a support component 1218 configured to transmit a report, to a base station, that the UE supports communication with mobile relays, e.g., as described in connection with 702 in FIG. 7. The apparatus may include an assistance information component 1220 configured to receive assistance information from the base station in response to the report, e.g., as described in connection with 704 in FIG. 7. The apparatus may include a measurement component 1222 configured to perform a measurement based on the SSB and report the measurement to a base station, e.g., as described in connection with 720 in FIG. 7. The report may indicate that the measurement is for the mobile relay, when the UE determines that the SSB is from the mobile relay.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
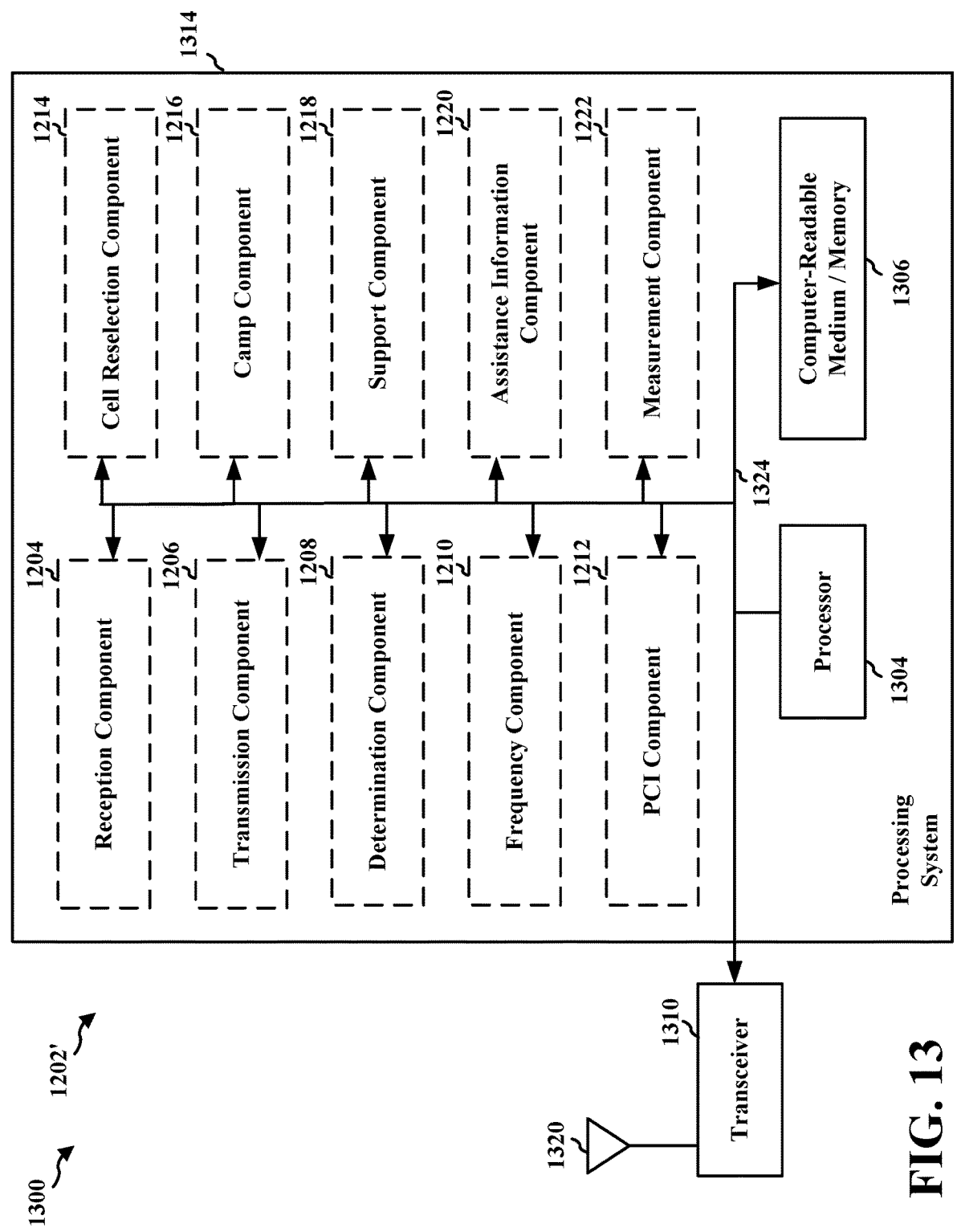
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, 1218, 1220, 1222, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218, 1220, 1222. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359. Alternatively, the processing system 1314 may be the entire UE (e.g., see 350 of FIG. 3).

In one configuration, the apparatus 1202/1202' for wireless communication includes means for receiving a synchronization signal/physical broadcast channel block (SSB); and means for determining whether the SSB is from a mobile relay based, at least in part, on information comprised in the SSB. The apparatus may include means for receiving, from a base station, an indication of raster frequencies associated with the mobile relays and comprising the raster frequency. The apparatus may include means for receiving, from a base station, a set of PCIs for mobile relays, wherein the set of PCIs comprises a subset of PCIs for stationary base stations. The apparatus may include means for determining that a PCI based on a PSS and a SSS comprised in the SSB is in the set of PCIs for the mobile relays. The apparatus may include means for using additional information to determine whether the SSB is from the mobile relay. The apparatus may include means for receiving, from a base station, one or more frequencies for the UE to use to search for mobile relays, wherein the UE determines whether the SSB is from the mobile relay based on whether the SSB is received within the one or more frequencies. The apparatus may include means for receiving, from a base station, one or more parameters for cell reselection involving mobile relays. The apparatus may include means for using the one or more parameters to perform the cell reselection when the UE determines that the SSB is received from the mobile relay. The apparatus may include means for receiving, from a base station, a signal enabling or disabling the UE from camping on mobile relays. The apparatus may include means for transmitting a report, to a base station, that the UE supports communication with mobile relays and means for receiving assistance information from the base station in response to the report. The apparatus may include means for performing a measurement based on the SSB, means for reporting the measurement to a base station, and means for indicating that the measurement is for the mobile relay, when the UE determines that the SSB is from the mobile relay. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a mobile relay, comprising:

generating a synchronization signal/physical broadcast channel block (SSB) for the mobile relay using:

a primary synchronization signal (PSS) for mobile relays that is different than a stationary base station PSS, wherein a sequence of the PSS for the mobile relays is different than a stationary base station PSS sequence based on a set value to initialize a register x for generating the sequence, a value m to map the register x to the sequence, and a rule to update the register x each being different for the mobile relays than for stationary base stations, the set value to initialize the register x for the stationary base stations being [x(6) x(5) x(4) x(3) x(2) x(1) x(0)]=[1 1 1 0 1 1 0], the value m to map the register x for the stationary base stations being $m=(n+43N_{ID}^{(2)})$ mod 127, and the rule to update the register x for the stationary base stations being $x(i+7)=(x(i+4)+x(i))$ mod 2, wherein n, i, and $N_{ID}^{(2)}$ are numeric values; and using at least one of:

a secondary synchronization signal (SSS) for the mobile relays that is different than a stationary base station SSS, a physical broadcast channel (PBCH) for the mobile relays that is different than a stationary base station PBCH; and a demodulation reference signal (DMRS) associated with the PBCH for the mobile relays that is different than a stationary base station DMRS; and broadcasting the SSB.

2. The method of claim 1, wherein the mobile relay uses the PSS for the mobile relays that is different than the stationary base station PSS, or the SSS for the mobile relays that is different than the stationary base station SSS.

3. The method of claim 2, wherein the mobile relay uses a symbol placement for the PSS or the SSS that is different than a stationary base station symbol placement, the stationary base station symbol placement for the PSS being a first symbol of the SSB, and the symbol placement of the mobile relay for the PSS being a different symbol than the first symbol of the SSB.

4. The method of claim 2, wherein the mobile relay uses an SSS sequence that is different than a stationary base station SSS sequence.

5. The method of claim 1, wherein the mobile relay uses the PBCH that is different than the stationary base station PBCH.

6. The method of claim 5, wherein the mobile relay applies a different scrambling to the PBCH than the stationary base station PBCH or applies a different scrambling to the DMRS associated with the PBCH.

7. The method of claim 6, wherein the different scrambling includes at least one of a first function for a scrambling initialization or a second function for applying the scrambling to the PBCH that is different than for the stationary base station.

8. The method of claim 1, wherein the mobile relay transmits the SSB using at least one raster frequency from a set of raster frequencies for mobile relays.

9. The method of claim 8, wherein the at least one raster frequency is based on a raster offset in frequency for the mobile relays.

10. The method of claim 1, wherein a physical cell identity (PCI) for the mobile relay is from a PCI pool for the mobile relays that is larger than a stationary base station PCI pool.

11. The method of claim 10, wherein the PCI pool for the mobile relays includes a set of SSS sequences that is larger than a stationary base station set of SSS sequences.

12. The method of claim 10, wherein the PCI for the mobile relay is indicated based on the PSS, the SSS, and at least one of the PBCH or the DMRS.

13. The method of claim 10, wherein the PCI for the mobile relay is indicated based on the PSS, the SSS, and an additional synchronization signal.

14. The method of claim 13, wherein scrambling for the PBCH or the DMRS is based on the PCI indicated by the PSS, the SSS, and the additional synchronization signal.

15. The method of claim 1, wherein generating the synchronization signal/physical broadcast channel block (SSB) for the mobile relay further comprises generating a tertiary synchronization signal (TSS) in addition to the PSS and the SSS.

16. An apparatus for wireless communication at a mobile relay, comprising:

a memory; and at least one processor coupled to the memory and configured to:

generate a synchronization signal/physical broadcast channel block (SSB) for the mobile relay using:

a primary synchronization signal (PSS) for mobile relays that is different than a stationary base station PSS, wherein a sequence of the PSS for the mobile relays is different than a stationary base station PSS sequence based on a set value to initialize a register x for generating the sequence, a value m to map the register x to the sequence, and a rule to update the register x each being different for the mobile relays than for stationary base stations, the set value to initialize the register x for the stationary base stations being $[x(6) \, x(5) \, x(4) \, x(3) \, x(2) \, x(1) \, x(0)]=[1 \, 1 \, 1 \, 0 \, 1 \, 1 \, 0]$, the value m to map the register x for the stationary base stations being $m=(n+43N_{ID}^{(2)}) \bmod 127$, and the rule to update the register x for the stationary base stations being $x(i+7)=(x(i+4)+x(i)) \bmod 2$, wherein n, i, and $N_{ID}^{(2)}$ are numeric values;

and using at least one of:

a secondary synchronization signal (SSS) for the mobile relays that is different than a stationary base station SSS, a physical broadcast channel (PBCH) for the mobile relays that is different than a stationary base station PBCH; and a demodulation reference signal (DMRS) associated with the PBCH for the mobile relays that is different than a stationary base station DMRS; and broadcast the SSB.

* * * * *